(12) United States Patent
Augenbraun et al.

(10) Patent No.: US 9,756,377 B2
(45) Date of Patent: Sep. 5, 2017

(54) SYSTEM AND METHOD FOR BROADCASTING WEB PAGES AND OTHER INFORMATION

(75) Inventors: Joseph E. Augenbraun, Princeton, NJ (US); Gerard K. Kunkel, Yardley, PA (US); Aaron Grosky, Doylestown, PA (US); Bruce Plotnick, Jamison, PA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 1612 days.

(21) Appl. No.: 11/071,426

(22) Filed: Mar. 3, 2005

(65) Prior Publication Data

US 2005/0149981 A1    Jul. 7, 2005

Related U.S. Application Data

(62) Division of application No. 09/736,393, filed on Dec. 15, 2000, now abandoned.

(Continued)

(51) Int. Cl.
| | |
|---|---|
| *H04N 21/431* | (2011.01) |
| *H04N 7/173* | (2011.01) |
| *H04N 21/2343* | (2011.01) |
| *H04N 21/2362* | (2011.01) |
| *H04N 21/2665* | (2011.01) |

(Continued)

(52) U.S. Cl.
CPC ..... *H04N 21/4316* (2013.01); *H04N 7/17318* (2013.01); *H04N 21/2362* (2013.01); *H04N 21/234363* (2013.01); *H04N 21/2665* (2013.01); *H04N 21/4345* (2013.01); *H04N 21/4622* (2013.01); *H04N 21/4722* (2013.01); *H04N 21/4782* (2013.01); *H04N 21/812* (2013.01); *H04N 21/858* (2013.01); *H04N 21/8586* (2013.01)

(58) Field of Classification Search
USPC ......... 725/29, 41, 46, 52, 68, 100, 109, 123, 725/153
See application file for complete search history.

(56) References Cited

U.S. PATENT DOCUMENTS

| | | |
|---|---|---|
| 5,077,607 A | 12/1991 | Johnson et al. |
| 5,296,931 A | 3/1994 | Na |

(Continued)

OTHER PUBLICATIONS

International Search Report, Apr. 3, 2001, International Application No. PCT/US00/33267, International Publication No. WO 01/45413A1.

(Continued)

*Primary Examiner* — Nathan Flynn
*Assistant Examiner* — Christine Kurien
(74) *Attorney, Agent, or Firm* — Merchant & Gould P.C.

(57) ABSTRACT

Embodiments of the invention provide a system and method for interactive broadcasting of information such as Internet web pages, television program guide, user account information, or the like on dedicated downstream channels in a cable television system. One embodiment provides picture-in-picture capability using a single tuner. More specifically, a headend includes a scaler application that reduces the size of the video program or a content related web page, which are then combined at the headend in a picture-in-picture format and transmitted over a distribution network to a user.

15 Claims, 3 Drawing Sheets

Related U.S. Application Data

(60) Provisional application No. 60/170,792, filed on Dec. 15, 1999, provisional application No. 60/170,793, filed on Dec. 15, 1999.

(51) Int. Cl.
    *H04N 21/434* (2011.01)
    *H04N 21/462* (2011.01)
    *H04N 21/4722* (2011.01)
    *H04N 21/4782* (2011.01)
    *H04N 21/81* (2011.01)
    *H04N 21/858* (2011.01)

(56) References Cited

U.S. PATENT DOCUMENTS

| | | | | |
|---|---|---|---|---|
| 5,506,628 A | | 4/1996 | Chun | |
| 5,657,072 A | | 8/1997 | Aristides et al. | |
| 5,666,293 A | | 9/1997 | Metz et al. | |
| 5,754,940 A | | 5/1998 | Smith et al. | |
| 5,768,539 A | | 6/1998 | Metz et al. | |
| 5,844,552 A | | 12/1998 | Gaughan et al. | |
| 5,900,916 A | | 5/1999 | Pauley | |
| 5,914,712 A | | 6/1999 | Sartain et al. | |
| 5,914,746 A | | 6/1999 | Matthews et al. | |
| 5,923,361 A | | 7/1999 | Sutton, Jr. | |
| 5,926,230 A | * | 7/1999 | Niijima et al. | 725/56 |
| 5,940,071 A | | 8/1999 | Treffers et al. | |
| 5,951,639 A | | 9/1999 | MacInnis | |
| 5,982,445 A | | 11/1999 | Eyer et al. | |
| 5,990,890 A | | 11/1999 | Etheredge | |
| 6,002,394 A | | 12/1999 | Schein et al. | |
| 6,005,562 A | * | 12/1999 | Shiga et al. | 715/721 |
| 6,018,764 A | * | 1/2000 | Field et al. | 709/217 |
| 6,057,890 A | | 5/2000 | Virden | |
| 6,105,060 A | | 8/2000 | Rothblatt | |
| 6,141,682 A | | 10/2000 | Barker | |
| 6,147,714 A | * | 11/2000 | Terasawa et al. | 348/564 |
| 6,195,530 B1 | | 2/2001 | Smith et al. | |
| 6,199,206 B1 | | 3/2001 | Nishioka et al. | |
| 6,240,555 B1 | | 5/2001 | Shoff et al. | |
| 6,337,719 B1 | | 1/2002 | Cuccia | |
| 6,392,664 B1 | | 5/2002 | White et al. | |
| 6,487,723 B1 | | 11/2002 | MacInnis | |
| 6,502,242 B1 | | 12/2002 | Howe et al. | |
| 6,570,579 B1 | * | 5/2003 | MacInnis et al. | 345/629 |
| 6,571,392 B1 | | 5/2003 | Zigmond et al. | |
| 6,606,747 B1 | | 8/2003 | Yuen et al. | |
| 6,621,870 B1 | | 9/2003 | Gordon et al. | |
| 6,886,178 B1 | * | 4/2005 | Mao et al. | 725/52 |
| 7,174,512 B2 | * | 2/2007 | Martin et al. | 715/719 |
| 2003/0126621 A1 | * | 7/2003 | Leak et al. | 725/135 |

OTHER PUBLICATIONS

Written Opinion, Oct. 25, 2001, International Application No. PCT/US00/33267.

\* cited by examiner

SYSTEM AND METHOD FOR BROADCASTING WEB PAGES AND OTHER INFORMATION

CROSS-REFERENCE TO RELATED APPLICATIONS

The present application is a divisional of pending U.S. patent application Ser. No. 09/736,393, filed on Dec. 15, 2000 now abandoned, entitled SYSTEM AND METHOD FOR BROADCASTING WEB PAGES AND OTHER INFORMATION, which application claims the benefit, under 35 USC 119 (e), of U.S. Provisional Application Nos. 60/170,792 and 60/170,793, both filed Dec. 15, 1999; all the prior applications are incorporated herein as if set forth in their entireties.

BACKGROUND OF THE INVENTION

1. Field of the Invention

The present invention relates to a system and method for broadcasting information, such as Internet web pages, over a networked distribution system, such as a cable television distribution system.

2. Description of the Background Art

U.S. Pat. No. 5,961,603, issued Oct. 5, 1999, U.S. Pat. No. 5,999,979, issued Dec. 7, 1999, and U.S. Pat. No. 6,049,539, issued Apr. 11, 2000, all of which are hereby incorporated by reference, disclose systems and methods for providing interactive access to an information source, such as the Internet, through a networked distribution system, such as a cable television distribution system. In a conventional cable television distribution system, video programming originating from remote and local sources is broadcast from a cable headend, through a plurality of downstream channels to a set top converter box (set top) located at each user's premises. The set top interfaces the received programming to the user's television or monitor, and includes a tuner that is used to select the channel to be viewed, typically by receiving commands from a remote control operated by the user. In the system disclosed in the '603 patent, a cable television user who is a subscriber to a special Internet access service, can access Internet web pages that are related to the present programming content of a cable television channel being viewed by the user. This technique is referred to as CHANNEL HYPERLINKING. In addition, the user can "surf" the Internet in a conventional manner with this system.

In the preferred embodiment disclosed in the '603 patent, the cable television distribution system includes a number of modifications for processing hyperlinking requests from the users. First, at least one upstream channel is provided between each user and the cable headend so that a user can enter hyperlinking requests into their set top, and forward them to the cable headend for processing. The cable headend processes each request by accessing a hyperlink database containing URL's (web addresses) of programming-content related Internet web pages, and retrieving a URL that has been assigned to the channel that the user is viewing for the time period during which the request is made. The cable headend then retrieves the web page from the Internet, or from memory, with an Internet browser application located in the headend, and downloads the web page to the user for viewing. As an example, the user, who may be viewing a television advertisement for a particular product, can thus hyperlink to a web page for that product with this system.

The preferred embodiment of the channel hyperlinking system disclosed in the '603 patent thus provides a convenient technique for enabling users to access additional information that is related to the content of the program they are currently viewing, by simply pressing a button on their remote control. However, the preferred embodiment is not designed for use with cable systems that provide only one-way communication between the cable headend and the system users, since the upstream channel is necessary to send channel hyperlinking requests to the headend.

Another feature that would be desirable in a channel hyperlinking system is "picture-in-picture" capability, wherein a user can simultaneously view both a broadcast television program and a content related web page, for example, so that they can continue watching television while interacting with a channel hyperlink, or conducting an Internet session. For example, the television program could be a scaled image within the web page, or vice versa. Picture-in-picture is easy to provide in a two-tuner set top where one tuner receives the video program, while the other tuner receives the channel hyperlink data. However, the typical set top only has a single in-band tuner that can be used for either video or data.

SUMMARY OF THE INVENTION

The present invention addresses the foregoing issues through provision of a networked distribution system that facilitates channel hyperlinking capabilities without the need for upstream channels, and also provides picture-in-picture capability without the need for multiple tuners. In a first preferred embodiment of the invention, the system is designed to provide continuous broadcast of Internet web pages, and other information, on one or more downstream channels. This system facilitates Internet access, including channel hyperlinking, without the requirement that information or hyperlinking requests be sent through an upstream channel for processing by the cable headend. Instead, hyperlink requests are processed in each user's set top converter box by a terminal processor that is programmed to identify a downstream channel on which the requested information is being broadcast, and instruct the set top's tuner to switch to that channel.

More particularly, to implement this embodiment of the present invention, the cable headend is modified to broadcast Internet web pages or other information on one or more downstream channels. Preferably, a multiplexing scheme is employed wherein each downstream channel broadcasts information for multiple web pages, or the like, in a carouseled manner in which multiple, repeating time slots are provided, one for each web page or groups of web pages to be broadcast. The multiplexing arrangement greatly increases the effective bandwidth of each channel, and provides for infinite scalability so that any number of web pages or other information may be continually broadcast over a limited number of channels. This is made possible by the fact that most web pages contain a limited amount of information, the majority of which is static. It is thus feasible to transmit the information for each page on a periodic basis, e.g., once every 10 seconds or so, with the only consideration being the amount of time that a user will be willing to wait for the requested information to arrive.

The set top's terminal processor recognizes Internet access and channel hyperlink requests that are directed to any of the broadcast web pages. More particularly, the terminal processor accesses a channel mapping database in the set top that maps each request received from a user via a remote control, keyboard or other input device, to the appropriate downstream channel and time slot therein, which is identified by a packet identifier (PID), on which the requested information is being broadcast. Using the PID information, the terminal processor instructs the set top's tuner to switch to the designated channel, and downloads the web page information for display on the user's television. To facilitate efficient downloading of the requested channel hyperlink content, the terminal processor preferably waits until the data of interest appears in the carousel at the headend, and then instructs the set top's tuner to switch away from the television channel that a user is currently viewing. The requested content is downloaded into a cache in the set top, and the tuner is then instructed to switch back to the original program channel. In this manner, the amount of time that the user cannot watch their program during downloading of the requested hyperlink content is minimized.

The foregoing arrangement also facilitates picture-in-picture capability without requiring the provision of two tuners in the set top. To achieve this, the terminal processor runs any suitable display manager program having picture-in-picture capability, which accesses the hyperlink content stored in the set top's cache, and overlays the content over the television program, or vice versa. The user can then simultaneously conduct an Internet session and continue watching the television program, for example.

There are a number of other changes that are preferably made in the headend to facilitate accessing of the web pages or other information being broadcast on the downstream channels. The first change involves the data encoding (e.g., MPEG 1 or MPEG 2) that is employed to encode the web page image data to reduce bandwidth requirements. In two-directional channel hyperlinking where the headend responds to a hyperlink request by downloading the content related information on a downstream channel, it is only necessary to transmit a full frame of image data, known as an I-frame, at the beginning of the transmission, and when the next image frame differs completely from the previous image frame. Otherwise, it is adequate if only differences between one image frame and the previous frame are transmitted. These are referred to as difference frames, and substantially reduce the bandwidth required for transmitting the information. However, in one-way channel hyperlinking, the headend does not have knowledge when a viewer has requested a hyperlink. It is thus necessary to send full I-frames every second or so to insure that set tops that tune to the channel get an I-frame within a short enough time period that the viewer is satisfied with the service. Thus, for any channel that is designated by the system to be a broadcast channel for web pages, the encoder is programmed to send full I-frames frequently enough that a viewer who is just tuning in, will not have to wait long for receipt of the web page data.

In another preferred embodiment of the present invention, single tuner picture-in-picture capability is provided in an alternative manner by formatting, combining and encoding the information for both data streams in the headend, and transmitting the combined data on one of the downstream channels to the user's set top box. This arrangement is particularly suited for use with the preferred embodiment disclosed in the '603 patent where channel hyperlink requests are sent to the headend via an upstream channel, or other communications link. When a hyperlinking request is received from a set top, processing equipment in the headend accesses the content related information, and combines it with a reduced, scaled version of the video programming that the user was viewing at the time the hyperlink request is sent. This combined information is then sent to the user's set top on one of the downstream channels. In the case of a content related web page, the set top will display the web page on the user's television or monitor with a reduced size image of the associated television program overlaid on a portion of the page. Alternatively, the size of the web page can be reduced so that the web page is overlaid on a full size television program. Thus, this alternative embodiment of the invention also provides picture-in-picture capability without the need for more than one tuner in the set top, and without the requirement that the additional image information be sent separately from the video program information.

BRIEF DESCRIPTION OF THE DRAWINGS

The features and advantages of the present invention will become apparent from the following detailed consideration of a preferred embodiment thereof, taken in conjunction with the accompanying drawing figures, in which.

DETAILED DESCRIPTION OF THE PREFERRED EMBODIMENTS

Figure 1:
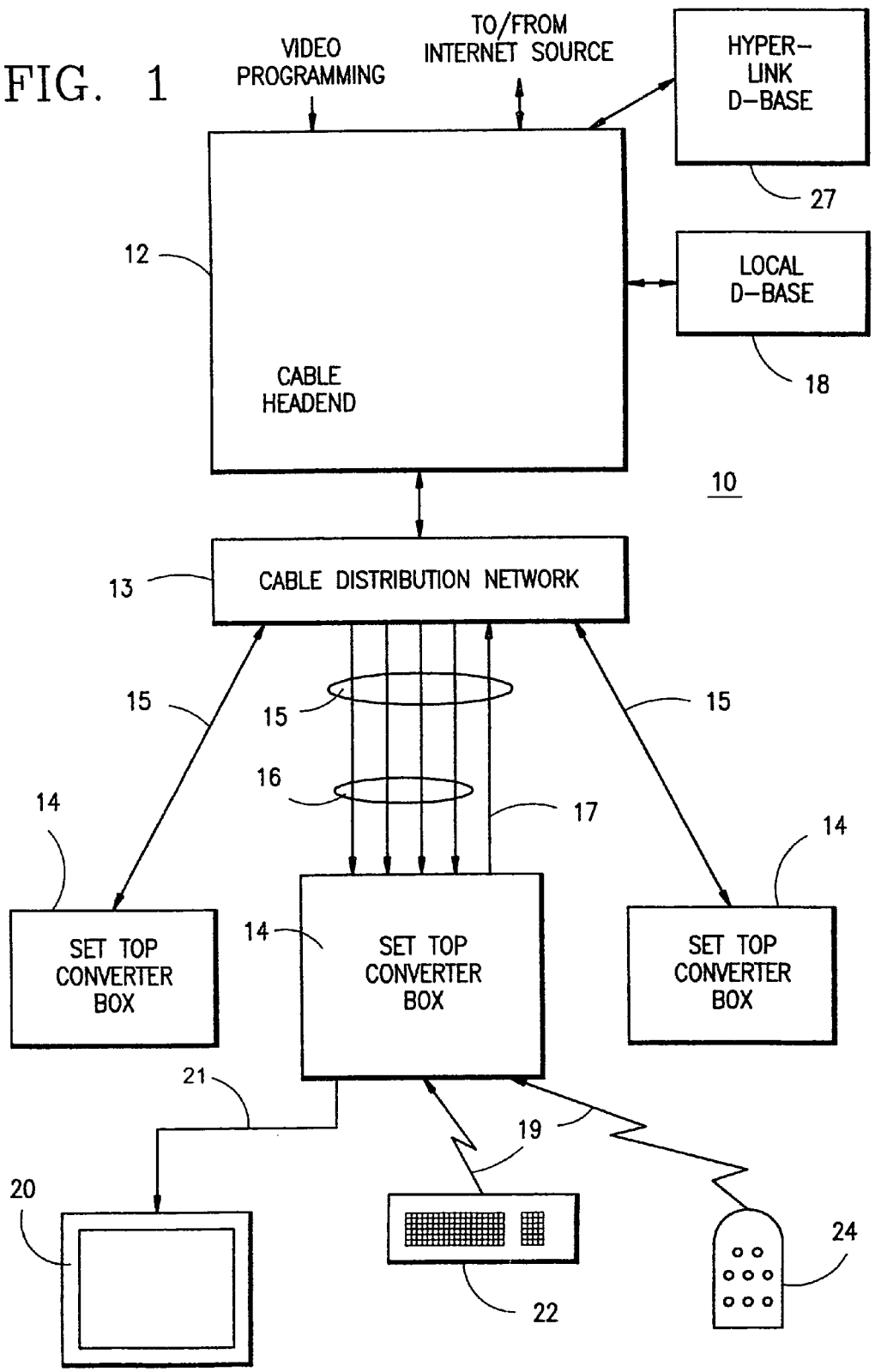
FIG. 1 is a block diagram of a CATV system that is constructed in accordance with the preferred embodiments of the present invention.

Turning now to a detailed consideration of a number of preferred embodiments of the present invention, FIG. 1 is a general block diagram of a CATV system 10 which incorporates elements for facilitating access and broadcast of Internet web pages and other information to a plurality of system users. The system 10 is illustrative of one type of system with which the concepts of the present invention may be employed. It should be noted that the CATV system 10 is illustrated in general form since many of its detailed elements are not necessary for an understanding of the present invention.

The CATV system 10 includes a cable headend 12 and a cable television distribution network 13 for interfacing the headend 12 to a plurality of terminal devices, which are preferably set top converter boxes 14 (set tops), but could be any other suitable receiving and processing device. A plurality of transmission links 15 interconnects the set tops 14 with the distribution network 13. Each of the links 15 is illustrated as being bidirectional with a plurality of downstream channels 16 and one or more upstream channels 17. The upstream channel 17 can be used, for example, for sending information from the set tops 14 to the headend 12, such as two-way channel hyperlinking requests in accordance with the method set forth in the '603 patent.

The cable headend 12 receives video programming and Internet-based and other information from remote sources (not shown), and transmits the video programming and other information through the distribution network 13 to the set tops 14. Alternatively or additionally, the information may be stored in one or more local databases 18 in, or interfaced to, the headend 12. The information can comprise many types of information, for example, television programming information, user account information, and advertisements.

Each of the set tops 14 is interfaced via a number of communication links 19 (e.g., cables, infrared wireless links, etc.) to a television or monitor 20 for displaying the received video programming and other information, and one or more input devices, such as a wireless keyboard 22 and a remote controller 24, for user interaction with the set top 14.

Figure 2:
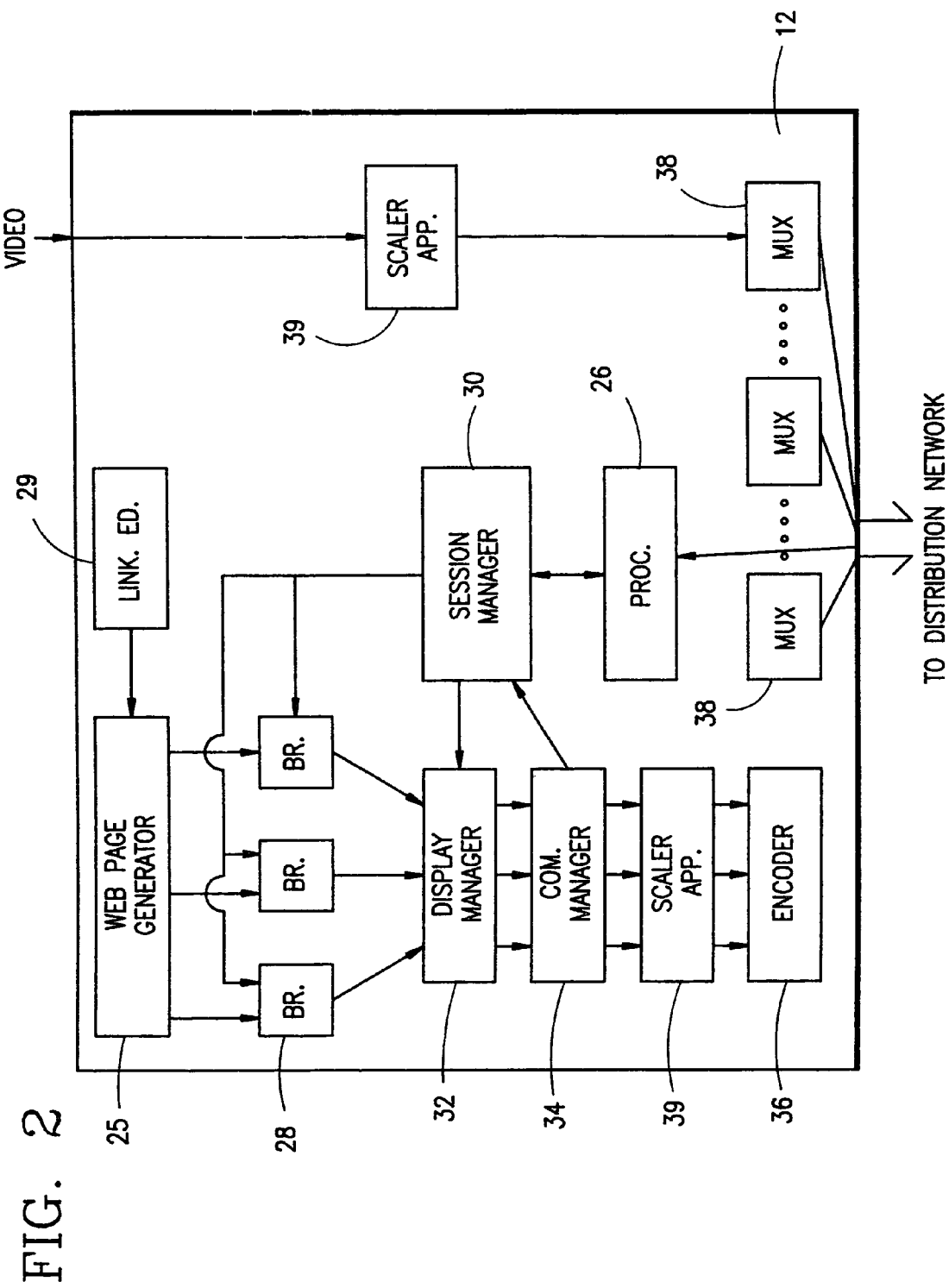
FIG. 2 is a block diagram of a cable headend that is employed in the system of FIG. 1.

The details of the elements in the headend 12 are illustrated in FIG. 2. Typically, the video programming that is received by the headend 12 is in either an analog format, or a digitally compressed or encoded format, such as MPEG 1 or MPEG 2. The Internet-based information, on the other hand, is typically HTML coded web pages along with still images coded in JPEG or GIF formats. The web pages are generated either by a web page generator 25 located in the headend 12, or by a web page generator at a remote location. As set forth in the '603 patent, the CATV system 10 allows a system user that is a subscriber to an Internet access service, to conduct an Internet session by sending appropriate commands via the keyboard 22 and/or remote controller 24 to a processor 26 in the headend 12. The headend processor 26 processes a hyperlink request by accessing a hyperlink database 27 that is either located in, or interfaced to, the headend 12, and retrieving a URL for the web page to be downloaded. The headend processor 26 then connects the user to one of a plurality of browser applications 28, retrieves the requested Internet information from the remote source or the local database 18, and downloads the information to the user's set top 14 for display on their television or monitor 20. In addition, the first preferred embodiment of the present invention also includes the capability of processing hyperlink and other Internet access requests in each of the set tops 14. As will be shown, this is made possible by continually broadcasting any number of Internet web pages from the headend 12, and providing the set tops 14 with channel and time slot information for each of the web pages. In this instance, the web page data is supplied to the browser applications 28, one for each web page to be broadcast, to generate web page bit map images to be broadcast to system users.

Preferably, additional data is added by the web page generator 25 (or by a remotely located web page generator) to the usual encoded image data to indicate relationships between the channels and which key sequences are to be used to select which channels. This data comprises linkage commands that are used to traverse the broadcast channels by menu instead of by channel, and to hyperlink to web pages from hyperlinks embedded in the broadcast channels. Though similar to tuning to a channel from a set top-resident channel guide, this differs in that the tuning would not be to a channel, but to a content stream and would be more like hyperlinking among web pages. Also, when broadcasting to set tops that can access the channel hyperlinking service disclosed in the '603 patent, the pages can provide links that function as access to this service.

To facilitate insertion of the linkage commands in the HTML web page data, the web page generator is preferably provided with a plug-in referred to as a linkage editor 29. The browser applications 28 are able to accept the linkage commands and generate data in the broadcast stream that would specify to set tops 14 the linkage commands on the current page.

An Internet session manager 30 is provided which starts the browser applications 28 and a display manager 32. The browser applications 28 and display manager 32 are interfaced to a communications manager 34 to facilitate downloading of the web pages to the system users. A video encoder 36, which may be an MPEG 1 or MPEG 2 encoder, for example, is also preferably provided in the headend 12 for encoding the web page bit map images before they are transmitted by the distribution network 13 to the set tops 14. The encoder 36 is employed to reduce the bandwidth necessary to transmit the data generated by the browser application 28, and to generate, for example, an MPEG standard compliant video stream.

From the encoder 36, the web page data for each of the web pages is passed through one or more digital multiplexers 38, each of which combines a plurality of the web pages into a single data stream that is fed to the distribution network 13 for broadcast on a corresponding digital one of the downstream channels 16. Each of the multiplexers 38 act as a carousel by employing a time division multiplexing scheme in which the data for each web page is assigned a time slot in a multiple time slot, repeating sequence. The number and length of slots in the sequence is selected based on the type and amount of information to be sent. In the event that the information is the HTML data for a static web page, then it is sufficient to send this data only once every 10 seconds or so, since each set top 14 need only receive the data once.

In one embodiment of the invention for implementing picture-in-picture graphics presentation without the need for multiple tuners, one or more scaler applications 39 are provided in the headend 12 for selectively reducing the size of either the video programming images or the web page images, so that one may be overlaid on the other. As is well known, a picture-in-picture format displays information in windows on a television screen that are a fraction of the size of an entire display screen. The reduced size and resolution of picture-in-picture images require less image data to be transmitted, and less bandwidth utilized, than is required to display a full screen image. In this embodiment of the present invention, the resulting excess bandwidth is utilized to transmit one or more overlays of information with the reduced image for display on a single television screen. Such overlays may include, but are not limited to, additional full motion video programs, web pages retrieved from the Internet, advertisements and television programming information.

The scaler applications 39 receive the incoming video programming or the web pages from the remote or local sources, and reduce the size of the video images by a predetermined amount before they are fed to one the encoders 36. The scaled and encoded video or other images are then multiplexed by one or more of the multiplexers 38, and may be combined with the other image information. As previously stated, with the advent of true interactive television, the present invention permits a user to simultaneously view a television program and conduct an Internet session utilizing a television with a single tuner. As information is retrieved by one of the browser applications 28, it is either encoded and multiplexed with the scaled and encoded video programming, or it is encoded, scaled and multiplexed with the video programming. The encoded and multiplexed data stream is then distributed via the distribution network 13 to the set top 14. The data stream may thus be displayed in a picture-in-picture format even where the set top 14 contains no scaling means and the system maintains a single tuner.

Figure 3:
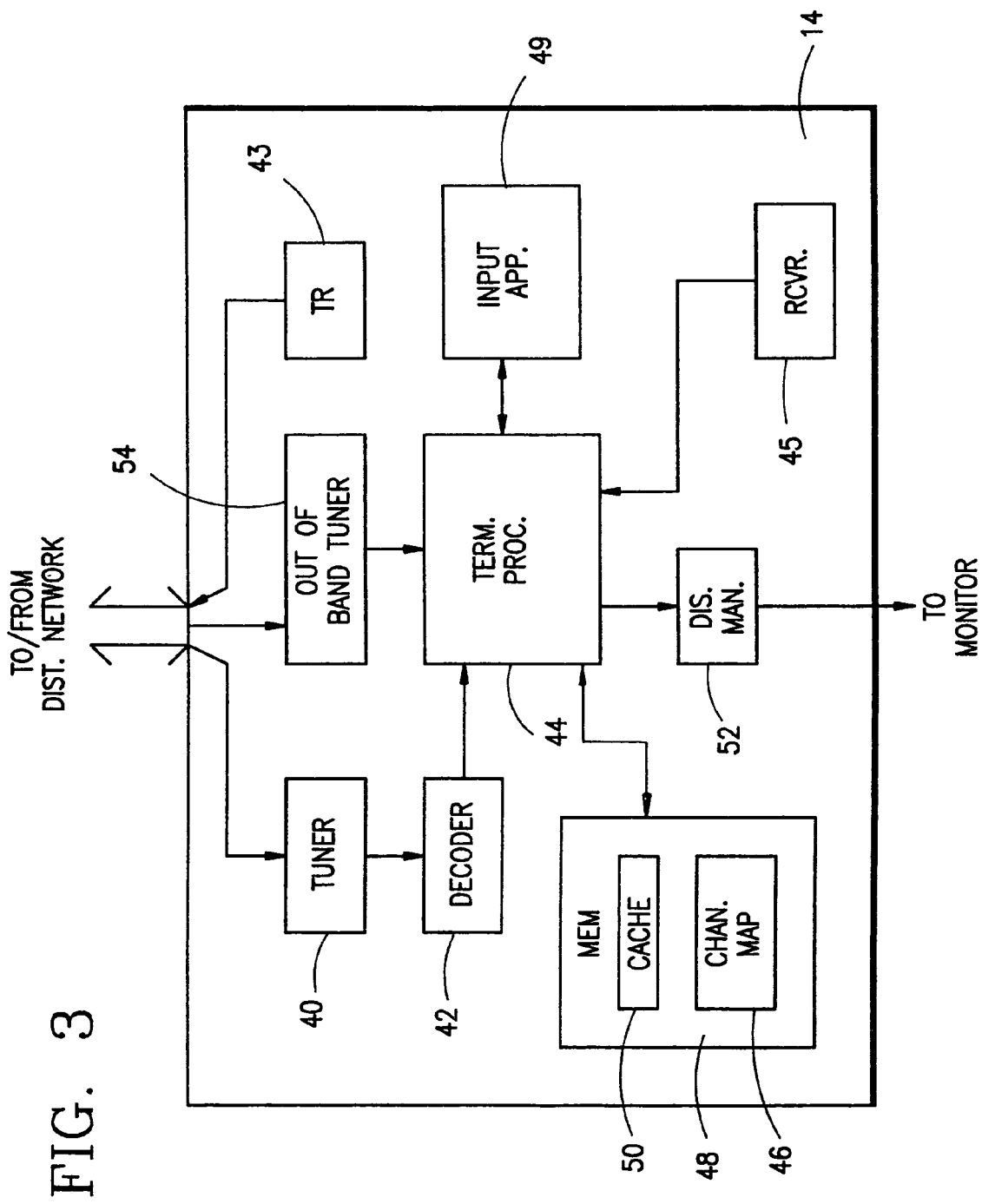
FIG. 3 is a block diagram of a set top converter box that is employed with the system of FIG. 1.

With reference to FIG. 3, the details of one of the set tops 14 are illustrated. A tuner 40 is provided for receiving the digitally encoded or compressed video programming and Internet-based information from the distribution network 13 on each of the downstream channels 16, and selecting the one of the downstream channels 16 from which information will be displayed on the television or monitor 20. From the tuner 40, the selected information passes through a decoder 42 which restores the video programming signals and web page image data to their original form for display on the television or monitor 20. The decoder 42 is of the same format as the encoder 36, such as MPEG 1 or MPEG 2, for example. In the case of a two-way system, an upstream transmitter 43 is also provided for transmitting hyperlink requests and other information to the headend 12 via the upstream channel 17.

The heart of the set top 14 is a terminal processor 44 that controls operation of the tuner 40 in response to requests received by an input receiver 45 (e.g., an infrared receiver) from the user via the keyboard 22 or remote controller 24. The terminal processor 44 is interfaced to a channel mapping database 46 that is contained in a memory 48, and stores channel mapping and hyperlink request identification information for any number of user selectable channel hyperlinks or assessable web pages or sites. For example, the user may actuate the hyperlink button on their remote controller 24 during a news, weather or sports television broadcast, and the terminal processor 44 will access the channel mapping database 46 to identify the hyperlink request, and determine on which of the downstream channels 16, and in which time slot or PID, related Internet based information (e.g., news, weather or sports web site) is being broadcast.

The terminal processor 44 determines the identity of the hyperlink using the linkage commands that are inserted by the linkage editor 29 at the headend 12. More particularly, an input application 49 is run by the terminal processor 44 that processes inputs received by the input receiver 45 by detecting when either the channel hyperlink button on the keyboard 22 or remote controller 24 has been pressed, or when a hyperlink button on a currently displayed image has been highlighted and selected by the user. Once the hyperlink request and corresponding channel and time slot information have been identified, the terminal processor 44 will then instruct the tuner 40 to switch to the designated channel so that the requested information can be downloaded into the set top 14 for display by a terminal display manager 52 on the user's television or monitor 20. A cache 50 can be provided in the memory 48 for pre-storing downloaded information if desired. To facilitate downloading of channel mapping and hyperlink request identification information from the headend 12 to the channel mapping database 46, an out-of-band tuner 54 can be provided that can also be used for transmission of signaling information, as is conventional. Alternatively, the channel mapping and hyperlink request identification information can be downloaded through one of the downstream channels 16 for reception by the in-band tuner 40.

In another embodiment of the invention for facilitating picture-in-picture capability using the single in-band tuner 40, the terminal processor 44 controls the tuner 40 in the following manner. For example, when the user enters a channel hyperlink request (e.g., by pressing the channel hyperlink button on the remote controller 24), the tuner 40 is instructed by the terminal processor 44 to briefly tune away from the television program to the appropriate data channel for receiving the hyperlink information. Any web pages or other information associated with the hyperlink are downloaded and stored in the set top's cache 50, and then the tuner 40 automatically tunes back to the television program. The user can then interact with the hyperlink content and continue watching the television program simultaneously using any suitable picture-in-picture graphics application that is programmed into the display manager 52.

To minimize the amount of time that the user cannot watch their program, the time-map of the channel hyperlink content that is stored in the channel mapping database 46 is employed by the terminal processor 44 to delay tuning off of the video channel until the data of interest appears in the multiplexer 38 at the headend 12, and is about to be broadcast. For example, if the multiplexer carousel is ten seconds long and the user presses the hyperlink button, there may be as much as a ten second wait for the data to appear in the carousel. Without using the time mapping information, and assuming a one second tuning time, the user would miss an average of eight seconds of their television program when pressing the channel hyperlink button (one second to tune to data channel, average of five seconds for data to come around in the carousel, one second to collect and process the data, and one second to tune back to video programming). However, by using the time mapping information, this delay can be reduced to three seconds: one second to tune the data channel, one second to collect and process the data and one second to tune back to the television program.

In the preferred embodiments of the present invention, a number of additional features are preferably employed. One feature involves the encoding procedure implemented by the encoder 36. To encode the web page image bit map data generated by the browser applications 28, the encoder 36 employs any known conventional algorithm for encoding motion picture video frames, such as MPEG 1 or MPEG 2. The first frame is encoded as an intra or I frame where information for all of the pixels in the frame needs to be transmitted since no previous frame information is available. In a hyperlinking application where a specific user is receiving web page data, the next frame in the sequence can then be encoded either as an P (predictive) frame or a B (bi-directional predictive-coded) frame which includes only the difference or motion vector data resulting from the frame comparisons. P or B frames can continue to be used for encoding the succeeding frames in the sequence until a substantial change, such as a scene change, occurs, thus necessitating formation of another I frame. The use of P or B frames substantially reduces bandwidth requirements since considerably less data has to be transmitted.

However, the foregoing technique is preferably modified in the embodiment of the present invention where web pages are continually broadcast on a selected channel to all system users. In this instance, it is preferable that the encoder 36 transmit a full I-frame frequently enough (e.g., once every second) that any of the set tops 14 which tune to the channel get an I-frame within a short enough time period that the viewer is satisfied with the service. Further, with this broadcast service, the stream must be constantly generated since the stream offers no feedback indicating how many of the set tops 14 are viewing the cable channel (stream) or when a set top tunes to or from a cable channel carrying the stream.

The headend communications manager 34 and its configuration are also preferably modified so that the configuration file can specify that a downstream channel is a broadcast channel, and will also specify a channel number that will be used when the communications manager 34 establishes an Internet session with the Internet session manager 30. That channel number is used to access an initial URL from the hyperlinking database 27. Whenever the communications manager 34 does not have an Internet session associated with the broadcast channel, the communications manager 34 establishes a session with the session manager 30. To do this, the communications manager 34 generates a hyperlinking login using the configured channel. The URL from the hyperlinking database 27 will be the first page displayed on the broadcast channel. That page may be the only page or may be one of a series of pages displayed at intervals (current HTML can step through the series of pages).

The broadcasting embodiment of the system 10 thus facilitates broadcast of web pages and other information over a group of channels to all users of the system 10, regardless of whether they are subscribers to an Internet access service offered by the cable company. This design not only supports the broadcast of static web pages, but support series of web pages and animated web pages. The system 10 can be used to broadcast several channels containing such diverse pages as stock ticker/news, headline news/sports, scrolling/paging detail reports, program guide information, weather and advertising. On a simple system the pages would be virtually unrelated, though they could suggest tuning to another channel for more details on stories. On a more advanced system, the pages could contain instructions to the set tops 14 so that pressing key sequences would automatically tune to the details.

The picture-in-picture embodiments of the invention permit requested information to be simultaneously displayed along with a video program, for example, that a user is currently viewing. As an example, in a two-way application, if a user sends a hyperlink request to the headend 12, the headend processor 26 will retrieve the requested information, e.g., web page, start one of the browser applications 28, combine the web page information with a reduced size version of the video program that the user is currently viewing by first applying the program to the scaler application 39, and download the combined information stream on one of the downstream channels 16. The set top processor 44 will then be instructed to switch the tuner 40 to that channel. In the one-way broadcasting embodiment, the same result is achieved by first downloading the web page information into the set top's cache 50, and then combining the stored information with the received video program using a picture-in-picture application in the set top display manager 52.

Although the invention has been disclosed in terms of a number of preferred embodiments and variations thereon, it will be understood that the scope of the invention as defined by the following claims is not limited thereto. For example, the preferred embodiments are directed to a cable television distribution network having Internet access capabilities. However, the concepts of the present invention can be applied to any type of networked broadcast distribution system that is capable of accessing or hyperlinking to any type of additional information.

The invention claimed is:

1. A network headend for accessing information from one or more sources, and broadcasting said information over a television distribution network, said headend comprising:
   a headend processor for receiving video programming, the headend processor further configured for receiving a hyperlink request via an upstream channel from a subscriber and, in response to receiving the hyperlink request, accesses a hyperlink database to retrieve a URL for a web page associated with the hyperlink request;
   a session manager, coupled to the headend processor, for initiating downloading the web page associated with the retrieved URL;
   a web page downloader, coupled to the session manager, the web page downloader receiving the retrieved URL from the session manager and, in response to receiving the hyperlink request from the subscriber and the web page downloader receiving the retrieved URL from the session manager, generating the web page based on the retrieved URL and providing linkage commands for the generated web page;
   a scaler, coupled to the communications manager, for receiving the video programming and the downloaded web page, the scaler generating a scaled down version of either one of a video program and the downloaded web page to overlay the other of the video program and the downloaded web page;
   a video encoder, coupled to the scaler, for encoding the web page to produce images of the web page;
   a multiplexer, coupled to the video encoder, for combining images of the web page and the video program that the subscriber is currently watching to produce a single data stream providing continuous broadcast of the video programming and the web pages on a downstream channel, the web page including the linkage commands allowing the subscriber to hyperlink to other web pages from hyperlinks embedded in the broadcast channels rather than switching between web pages by tuner channel selection; and
   in response to receipt of the hyperlink request, a set top box utilizing a single tuner to temporarily tune away from the video program the subscriber is currently watching to receive and store the web page at the set top box and then automatically tune back to the same video program via the single tuner;
   wherein an internet session may be conducted while simultaneously viewing the stored web page and the video program via the set top box by overlaying the scaled down version of either one of the video program or the downloaded web page over the other of the video program and the downloaded web page.

2. The headend of claim 1, wherein the web page downloader further comprises:
   a browser application, coupled to the session manager, for receiving the retrieved URL from the session manager;
   a web page generator, coupled to the browser application, for generating the web page based on the retrieved URL;
   a linkage editor, coupled to the web page generator; for providing the linkage commands for the generated web page; and
   a communications manager, coupled to the browser application and the session manager, for managing communications between the session manager and the browser application to facilitate downloading the web page.

3. The headend of claim 1, wherein the encoder encodes the scaled web page prior to the multiplexer combining the scaled web page with the video programming.

4. The headend of claim 1 further comprising receiving a television program guide and user account information.

5. The headend of claim 1, wherein the web page is related to a program content of the video programming.

6. A method for transmitting multiple information streams in a networked distribution system, comprising:
   receiving video programming at a headend processor;
   receiving a hyperlink request at the headend processor via an upstream channel from a subscriber;
   in response to receiving the hyperlink request from the subscriber, accessing a hyperlink database to retrieve a URL for a web page associated with the hyperlink request;
   initiating, by a session manager, downloading the web page associated with the retrieved URL;
   receiving, at a web page downloader, the retrieved URL from the session manager;

in response to receiving the hyperlink request from the subscriber and the web page downloader receiving the retrieved URL from the session manager, generating the web page, at the web page downloader, based on the retrieved URL;

providing, by the web page downloader, linkage commands for the generated web page;

receiving the video programming and the downloaded web page at a scaler;

generating, at the scaler, a scaled down version of the downloaded web page to overlay the video programming;

encoding the web page, at a video encoder, to produce images of the web page; and combining images of the web page and a video program the subscriber is currently watching, at a multiplexor, to produce a single data stream providing continuous broadcast of the video program and the web pages on a downstream channel, the web page including the linkage commands allowing the subscriber to hyperlink to other web pages from hyperlinks embedded in the broadcast channels rather than switching between web pages by tuner channel selection; and in response to receipt of the hyperlink request, utilizing a single tuner to temporarily tune away from the video program the subscriber is currently watching to receive and store the web page at a set top box and then automatically tune back to the same video program via the single tuner;

conducting an internet session while simultaneously viewing the stored web page and the video program via the set top box by overlaying the scaled down version of either one of the video program or the downloaded web page over the other of the video program and the downloaded web page.

7. The method of claim 6, wherein the providing a web page downloader further comprising:

providing a browser application, coupled to the session manager, for receiving the retrieved URL from the session manager;

providing a web page generator, coupled to the browser application, for generating the web page based on the retrieved URL;

providing a linkage editor, coupled to the web page generator; for providing the linkage commands for the generated web page; and providing a communications manager for managing communications between the session manager and the browser application to facilitate downloading the web page.

8. The method of claim 6, wherein the encoding further comprises encoding the scaled web page prior to combining the scaled web page with the video programming.

9. The method of claim 6 further comprising receiving a television program guide and user account information.

10. The method of claim 6, wherein the web page is related to a program content of said video programming.

11. A method for transmitting multiple information streams in a networked distribution system, comprising:

receiving video programming at a headend processor;

receiving a hyperlink request at the headend processor via an upstream channel from a subscriber;

in response to receiving the hyperlink request from the subscriber, retrieving a URL for a web page associated with the hyperlink request;

initiating, by a session manager, downloading the web page associated with the retrieved URL;

receiving, at a web page downloader, the retrieved URL from the session manager;

in response to receiving the hyperlink request from the subscriber and the web page downloader receiving the retrieved URL from the session manager, generating the web page, at the web page downloader, based on the retrieved URL;

receiving the video programming and the downloaded web page at a scaler;

generating, at the scaler, a scaled down version of the downloaded web page to overlay the video programming;

encoding the web page, at a video encoder, to produce the web page; and combining the web page and a video program the subscriber is currently watching, at a multiplexor, to produce a single data stream providing continuous broadcast of the video program and the web pages on a downstream channel, the web page including the linkage commands allowing the subscriber to hyperlink to other web pages from hyperlinks embedded in the broadcast channels rather than switching between web pages by tuner channel selection; and in response to receipt of the hyperlink request, utilizing a single tuner to temporarily tune away from the video program the subscriber is currently watching to receive and store the web page at a set top box and then automatically tune back to the same video program via the single tuner;

conducting an internet session while simultaneously viewing the stored web page and the video program via the set top box by overlaying the scaled down version of either one of the video program or the downloaded web page over the other of the video program and the downloaded web page.

12. The method of claim 11, wherein the providing a web page downloader further comprising:

providing a browser application, coupled to the session manager, for receiving the retrieved URL from the session manager;

providing a web page generator, coupled to the browser application, for generating the web page based on the retrieved URL;

providing a linkage editor, coupled to the web page generator; for providing the linkage commands for the generated web page; and providing a communications manager for managing communications between the session manager and the browser application to facilitate downloading the web page.

13. The method of claim 11, wherein the encoding further comprises encoding the scaled web page prior to combining the scaled web page with the video programming.

14. The method of claim 11, further comprising receiving a television program guide and user account information.

15. The method of claim 11, wherein the web page is related to a program content of said video programming.

* * * * *